United States Patent
Bernhardt et al.

(10) Patent No.: US 10,217,492 B2
(45) Date of Patent: *Feb. 26, 2019

(54) PREVENTING PHYSICAL REMOVAL OF A DRIVE WITH A MEDIUM IN MOTION FOR MITIGATING DAMAGE EVENTS TO COMPONENTS OF THE DRIVE

(71) Applicant: International Business Machines Corporation, Armonk, NY (US)

(72) Inventors: Bradley A. Bernhardt, Tucson, AZ (US); Thomas J. Fleischman, Poughkeepsie, NY (US); Richard Hutzler, Tucson, AZ (US); Mitchell Montanez, Tucson, AZ (US); William K. Morse, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/791,272

(22) Filed: Oct. 23, 2017

(65) Prior Publication Data
US 2018/0122428 A1    May 3, 2018

Related U.S. Application Data

(63) Continuation of application No. 15/342,979, filed on Nov. 3, 2016, now Pat. No. 9,830,952.

(51) Int. Cl.
| | | |
|---|---|---|
| *G11B 33/14* | (2006.01) | |
| *G11B 33/12* | (2006.01) | |
| *G11B 33/02* | (2006.01) | |
| *G11B 19/20* | (2006.01) | |
| *G11B 33/06* | (2006.01) | |

(52) U.S. Cl.
CPC ............ *G11B 33/124* (2013.01); *G11B 19/20* (2013.01); *G11B 33/022* (2013.01); *G11B 33/06* (2013.01); *G11B 33/14* (2013.01)

(58) Field of Classification Search
CPC ........ G11B 33/14; G11B 33/022; G11B 33/06
See application file for complete search history.

(56) References Cited

U.S. PATENT DOCUMENTS

| | | |
|---|---|---|
| 4,447,900 A | 5/1984 | Schatteman et al. |
| 4,912,580 A | 3/1990 | Hanson |
| 5,077,722 A | 12/1991 | Geist et al. |
| 5,515,215 A | 5/1996 | Hanson |

(Continued)

OTHER PUBLICATIONS

Bernhardt et al., U.S. Appl. No. 15/342,979, filed Nov. 3, 2016.

(Continued)

*Primary Examiner* — Brian E Miller
(74) *Attorney, Agent, or Firm* — Zilka-Kotab, P.C.

(57) ABSTRACT

In one embodiment, a computer-implemented method includes determining whether a medium in a drive is in motion, the drive being mounted in a receptacle. In response to determining that the medium is in motion, physical removal of the drive from the receptacle is prevented. In another embodiment, a computer program product for controlling removal of a drive includes a computer readable storage medium having program instructions embodied therewith. The computer readable storage medium is not a transitory signal per se. The program instructions are readable and/or executable by a computer to cause the computer to perform the foregoing method.

20 Claims, 6 Drawing Sheets

(56) References Cited

U.S. PATENT DOCUMENTS

| | | |
|---|---|---|
| 5,660,065 A | 8/1997 | Edlund |
| 5,784,350 A | 7/1998 | Akiba et al. |
| 5,973,919 A | 10/1999 | Larabell |
| 6,008,992 A | 12/1999 | Kawakami |
| 6,298,017 B1 | 10/2001 | Kulakowski et al. |
| 6,310,777 B1 | 10/2001 | Knott |
| 6,321,335 B1 | 11/2001 | Chu |
| 6,774,808 B1 | 8/2004 | Hibbs et al. |
| 6,957,351 B2 | 10/2005 | Emberty et al. |
| 7,260,885 B2 | 8/2007 | Albrecht et al. |
| 7,614,893 B2 | 11/2009 | Khodorkovsky et al. |
| 7,684,288 B2 | 3/2010 | Kaneko et al. |
| 9,195,859 B2 | 11/2015 | Parsonese et al. |
| 9,830,952 B1 | 11/2017 | Bernhardt et al. |
| 10,157,642 B2 | 12/2018 | Bernhardt et al. |
| 2010/0023956 A1 | 1/2010 | Bondurant et al. |
| 2014/0331009 A1 | 11/2014 | Parsonese et al. |
| 2018/0122427 A1 | 5/2018 | Bernhardt et al. |

OTHER PUBLICATIONS

Bernhardt et al., U.S. Appl. No. 15/791,255, filed Oct. 23, 2017.
Non-Final Office Action from U.S. Appl. No. 15/791,255, dated Dec. 27, 2017.
Bradley et al., U.S. Appl. No. 15/342,979, filed Nov. 3, 2016.
Non-Final Office Action from U.S. Appl. No. 15/342,979, dated Mar. 22, 2017.
Notice of Allowance from U.S. Appl. No. 15/342,979, dated Jul. 19, 2017.
Final Office Action from U.S. Appl. No. 15/791,255, dated Jun. 12, 2018.
Notice of Allowance from U.S. Appl. No. 15/791,255, dated Aug. 9, 2018.
Supplemental Notice of Allowance from U.S. Appl. No. 15/791,255, dated Nov. 5, 2018.

PREVENTING PHYSICAL REMOVAL OF A DRIVE WITH A MEDIUM IN MOTION FOR MITIGATING DAMAGE EVENTS TO COMPONENTS OF THE DRIVE

BACKGROUND

The present invention relates to media drives, and more specifically, this invention relates to selective physical removal of a media drive from a receptacle.

SUMMARY

In one embodiment, a computer-implemented method includes determining whether a medium in a drive is in motion, the drive being mounted in a receptacle. In response to determining that the medium is in motion, physical removal of the drive from the receptacle is prevented.

In another embodiment, a computer program product for controlling removal of a drive includes a computer readable storage medium having program instructions embodied therewith. The computer readable storage medium is not a transitory signal per se. The program instructions are readable and/or executable by a computer to cause the computer to perform the foregoing method.

In yet another embodiment, a system includes a mechanism configured to selectively prevent physical removal of a drive from a receptacle, and a processing circuit configured to control the mechanism. The processing circuit causes the mechanism to prevent the locking mechanism from allowing physical removal of the drive from the receptacle in response to determining that a medium in the drive is in motion.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for controlling removal of a drive for preventing removal of the drive when a medium is in motion.

In one general embodiment, a computer-implemented method includes determining whether a medium in a drive is in motion, the drive being mounted in a receptacle, in response to determining that the medium is in motion, preventing physical removal of the drive from the receptacle, and in response to determining that the medium is not in motion, allowing physical removal of the drive from the receptacle.

In another general embodiment, a computer program product for controlling removal of a drive includes a computer readable storage medium having program instructions embodied therewith. The computer readable storage medium is not a transitory signal per se. The program instructions are readable and/or executable by a computer to cause the computer to perform the foregoing method.

In yet another general embodiment, a system includes a locking mechanism configured to selectively prevent physical removal of a drive from a receptacle, an interlock configured to selectively prevent the locking mechanism from allowing physical removal of the drive from the receptacle, and a processing circuit configured to control the interlock. The processing circuit causes the interlock to prevent the locking mechanism from allowing physical removal of the drive from the receptacle in response to determining that a medium in the drive is in motion. The processing circuit causes the interlock to allow the locking mechanism to allow physical removal of the drive from the receptacle in response to determining that the medium in the drive is not in motion.

Figure 1:
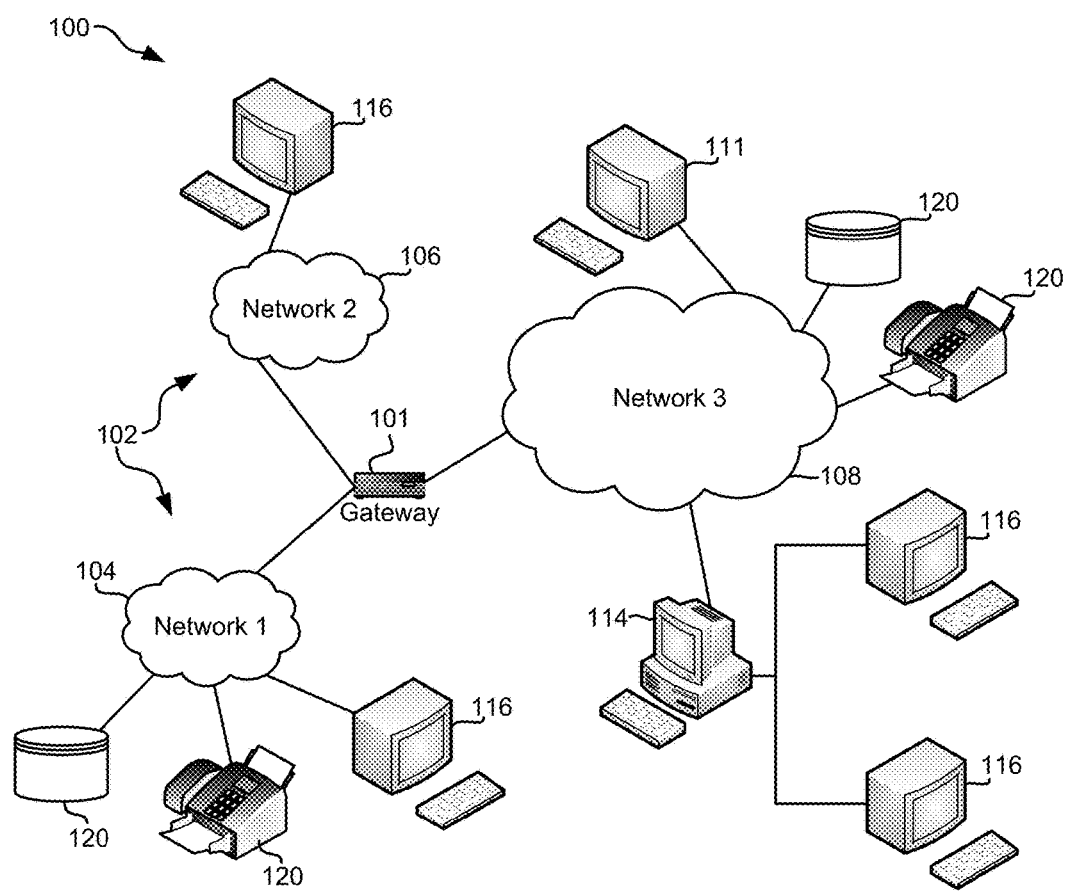
FIG. 1 illustrates a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
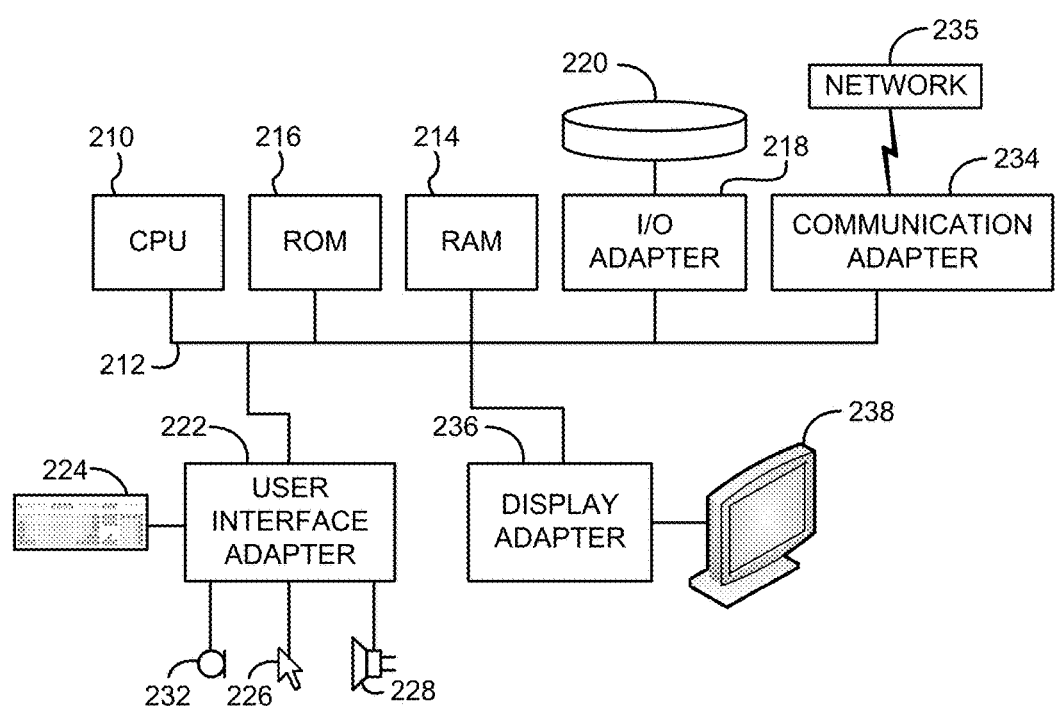
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
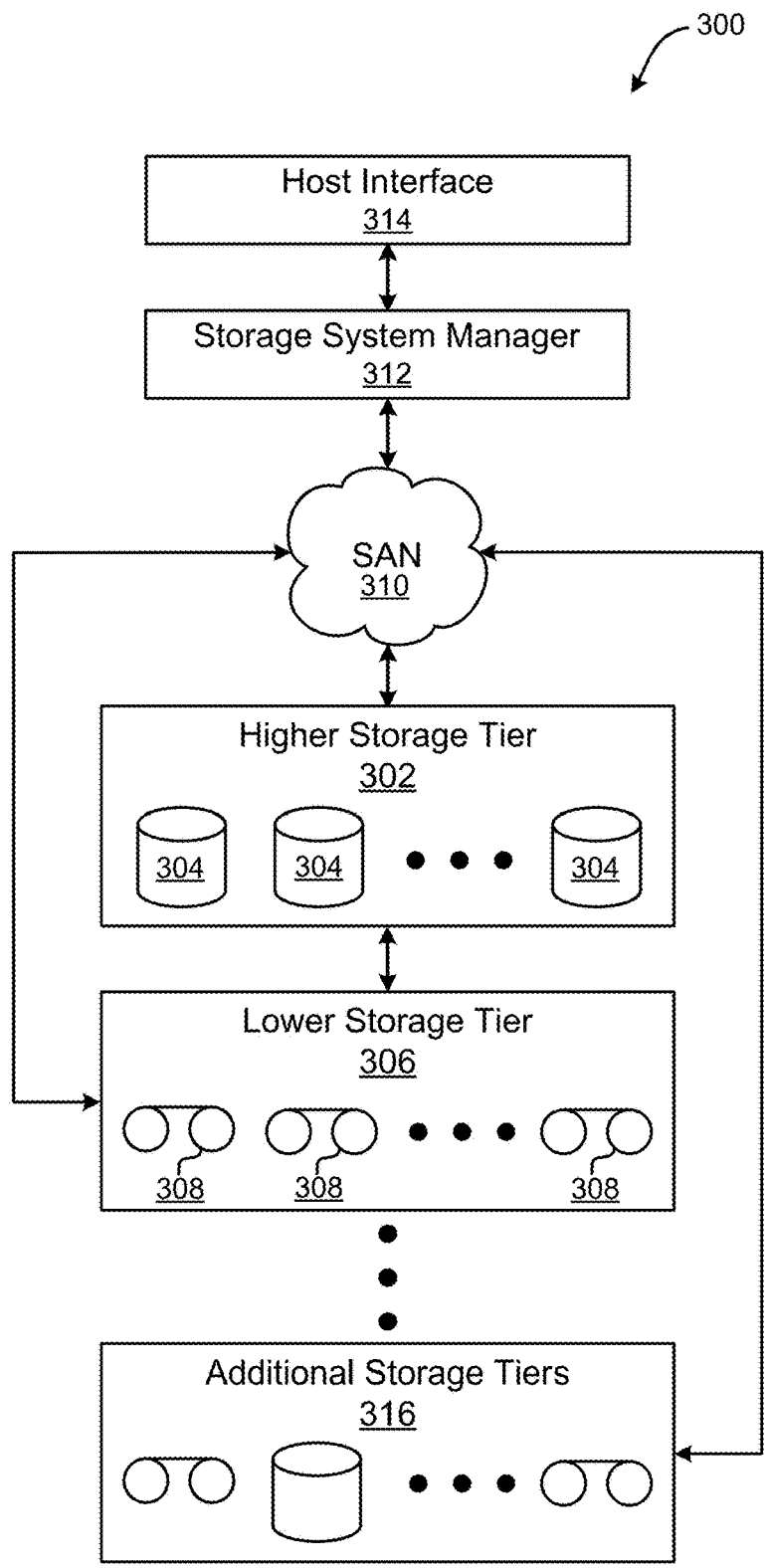
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Conventional computer systems, such as but not limited to a user device 116 and/or server 114 as in FIGS. 1-2, as well as storage tiers such as but not limited to those shown in FIG. 3, may include one or more disk drive modules (DDMs). The DDMs may include disks, such as hard disks. While a disk of a DDM is actively in motion, the act of pulling the DDM from a drive rack may result in damage to the disk and/or components of the DDM. For example, pulling a DDM with a disk in motion from a drive rack creates a potential that that the read/write head will contact the platters, thereby causing a head crash. This may thereby result in a loss of data and/or head damage.

According to another example, the DDM may be damaged in response to the DDM being removed from a drive rack with rough handling. Rough handling may include removing the DDM while the disk is spinning, and then setting the DDM down on its edge, where the DDM may then tip over to its flat side. In such an example, the damage to the DDM may include a head crash, similar to the previous example.

The damage events described above have been observed in test labs. For example, during simulated field replace unit (FRU) replacement scenarios, head crashes have been observed to occur in response to pulling a drive that has a disk in motion. Such damage events have also been observed to occur while using a recovery package to remove drives (that have a disk in motion) from one rack to another rack.

Embodiments described herein prevent damage events from occurring in a drive that might otherwise occur in response to removing the drive from a receptacle when a medium of the drive is in motion, by selectively preventing removal of the drive from the drive's receptacle.

Figure 4A:
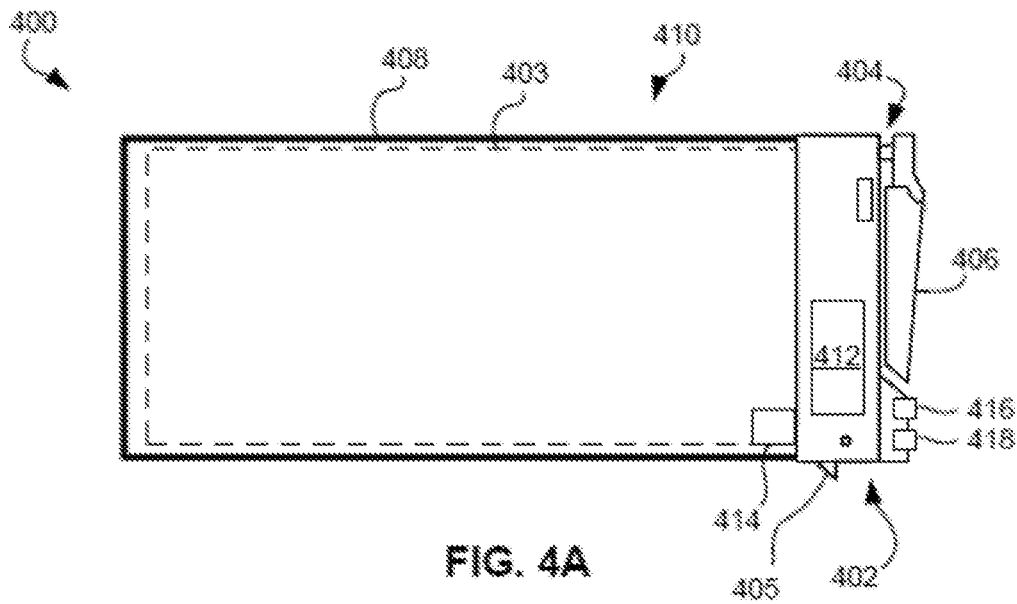
FIG. 4A illustrates a side view of a module and a receptacle of a system with a locking mechanism in a locked position, in accordance with one embodiment.
Figure 4B:
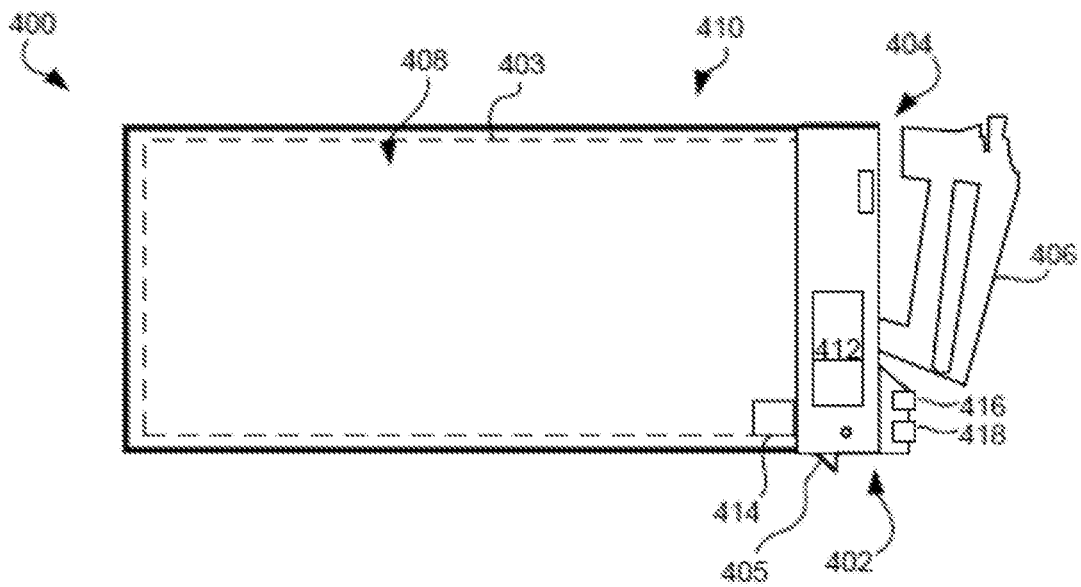
FIG. 4B illustrates a side view of the module of FIG. 4A with the locking mechanism in a position between the locked and unlocked positions.
Figure 4C:
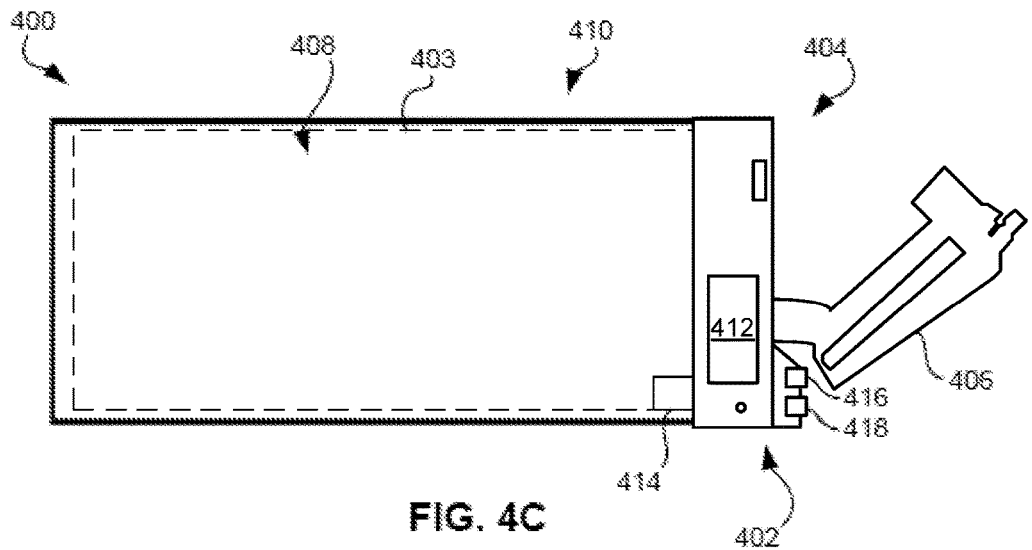
FIG. 4C illustrates a side view of the module of FIG. 4B with the locking mechanism in the locked unlocked position.

FIGS. 4A-4C depict a system 400, in accordance with one embodiment. As an option, the present system 400 may be implemented in conjunction with features from any other embodiment listed herein, such as those described with reference to the other FIGS., such as FIGS. 1-3. However, such system 400 and others presented herein may be used in various applications and/or in permutations which may or may not be specifically described in the illustrative embodiments listed herein. Further, the system 400 presented herein may be used in any desired environment. Thus FIGS. 4A-4C (and the other FIGS.) may be deemed to include any possible permutation.

Referring now to FIG. 4A, system 400 includes a locking mechanism 402 configured to selectively prevent physical removal of a drive 403 from a receptacle 410, and an interlock 412 configured to selectively prevent the locking mechanism 402 from allowing physical removal of the drive 403 from the receptacle 410 when the medium in the drive is in motion. According to various embodiments, a portion of the locking mechanism 402 may be engaged with a portion of system 400 to prevent the drive 403 from being removed from the receptacle 410 when the medium in the drive is in motion. For example, as illustrated in FIG. 4A, a cam lock portion 405 of the locking mechanism 402 may be in an engaged position that physically prevents the drive 403 from being removed from the receptacle 410.

It may be noted that according to various embodiments, the drive 403 of system 400 may be a hard disk drive.

As mentioned above, the locking mechanism 402 may be configured to selectively prevent physical removal of the drive 403 from the receptacle 410. According to one embodiment, the locking mechanism 402 may be coupled to the drive 403. For example, the locking mechanism may lock the drive 403 in place in the receptacle when in a locked position, and enable withdrawal of the drive 403 from the receptacle when in an unlocked position by pulling a latch 406 of the locking mechanism to an unlocked position. In some approaches, the latch 406 may function as a handle, e.g., by pulling the latch in a direction away from the receptacle.

In some approaches, the locking mechanism 402 may be integrated with the drive 403, e.g., during manufacturing of the drive 403.

According to another embodiment, the locking mechanism 402 may be coupled to the receptacle 410. The locking mechanism 402 may block at least a portion of the removal path of the drive 403 from the receptacle 410. For example, the drive 403 may be insertable and removable from receptacle 410 when the latch 406 is in an unlocked position. The locking mechanism 402 may be coupled to the receptacle 410 during fabrication of system 400. Alternatively, the locking mechanism 402 may be coupled to the receptacle 410 at any point after the fabrication of system 400, e.g., such as by affixing the locking mechanism 402 onto a location of the receptacle 410 at which a portion of the locking mechanism 402 may block the removal path that the drive 403 uses to exit the receptacle 410.

Referring to the exemplary embodiment in FIG. 4A, the locking mechanism 402 is coupled to the drive and includes a cam lock portion 405 that engages some part of the system, such as the receptacle, the storage rack of which the receptacle is part, a computer frame, etc. However, in another approach, the locking mechanism 402 may include a cylinder flap lock. According to yet another approach, the locking mechanism 402 may include a mechanical lock of a type that would become apparent to one skilled in the art upon reading the descriptions herein.

It may be noted that the drive 403 of system 400 is shown in shadow in FIGS. 4A-4C because the drive 403 may be located in an inner periphery of the receptacle 410 and therefore is obstructed from view by the exterior sidewalls 408 of the receptacle 410.

System 400 also includes an interlock 412 configured to selectively prevent the locking mechanism 402 from allowing physical removal of the drive 403 from the receptacle 410 when the medium in the drive is in motion. According to various embodiments, the interlock 412 may be configured to prevent the locking mechanism 402 from allowing physical removal of the drive 403 from the receptacle 410 by physically engaging with the locking mechanism 402, e.g., where the drive 403 might otherwise be removable from the receptacle 410, were a user to pull on the latch 406 and the interlock 412 not preventing such removal.

Any type of mechanism for preventing the locking mechanism 402 from allowing physical removal of the drive 403 from the receptacle 410 that would become apparent to one skilled in the art upon reading the descriptions herein may be used. According to one approach, the interlock 412 may include a spring assisted pin that selectively engages the locking mechanism 402 to prevent the locking mechanism 402 from allowing physical removal of the drive 403 from the receptacle 410. In such an approach, the spring assisted pin selectively engaging with the locking mechanism 402 may prevent the drive 403 from being physically removed from the receptacle 410. Moreover, in such an approach, physical removal of the drive 403 from the receptacle 410 may be allowed, in response to the spring assisted pin selectively not engaging the locking mechanism 402, such as when it is determined that a medium in the drive 403 is not in motion.

According to another approach, the interlock 412 may additionally and/or alternatively include a mechanical screw lock. In response to the mechanical screw lock turning, a portion of the mechanical screw lock may physically engage with the locking mechanism 402 to prevent the locking mechanism 402 from allowing physical removal of the drive 403 from the receptacle 410. For example, in such an approach, the mechanical screw may contact the locking mechanism 402, in response to the mechanical screw lock selectively rotating in a particular rotational direction, to prevent the cam lock portion 405 of the locking mechanism 402 from retracting.

While selectively preventing physical removal of the drive 403 from the receptacle 410, power may be allowed to be removed from any drive mechanism. Some power may be provided to the media carrier to allow media state sensing as appropriate, e.g., see media state sensing in method 500.

According to other approaches, the interlock 412 may additionally and/or alternatively include a latch, a solenoid, an interlock of a type that would be appreciated by one skilled in the art upon reading the present descriptions, etc.

System 400 also includes the processing circuit 414 configured to control the interlock 412. The processing circuit 414 may be indirectly and/or directly coupled to the interlock 412.

The processing circuit 414 may cause the interlock 412 to prevent the locking mechanism 402 from allowing physical removal of the drive 403 from the receptacle 410 in response to determining that a medium, e.g., such as a hard disk, in the drive 403 is in motion. The processing circuit 414 may additionally and/or alternatively cause the interlock 412 to allow the locking mechanism 402 to allow physical removal of the drive 403 from the receptacle 410 in response to determining that the medium in the drive 403 is not in motion. Various descriptions elsewhere herein describe in detail how the processing circuit 414 determines how to selectively prevent and/or allow physical removal of the drive 403 from the receptacle 410, e.g., see method 500, and particularly the description of operations 504-506.

The processing circuit 414 may be indirectly and/or directly coupled to an indicator component 418. The processing circuit 414 may cause the indicator component 418 to indicate to a user that the medium is in motion, in response to determining that the user in the process of attempting to remove the drive 403 from the receptacle 410 when the medium is in motion. According to one approach, the indicator component 418 may include an audible alarm. According to another approach, the indicator component 418 may include a vibrating component, e.g., that vibrates the latch 406, a handle on the drive, etc. According to yet another approach, the indicator component 418 may include a light which may flash and/or be illuminated in response to a user attempting to pull the drive 403 from the receptacle 410, while the medium in the drive 403 is in motion. Ideally, the indicator component may include multiple modes of alerts.

As shown in the progression of FIGS. 4A-4C, the locking mechanism 402 may be positionable between at least three positions. The locking mechanism 402 may prevent removal of the drive 403 from the receptacle 410 when the locking mechanism 402 is in a locked position, e.g., see the locking mechanism 402 illustrated in the locked position in FIG. 4A. In the locked position, at least a portion of the locking mechanism 402 may be engaged, e.g., see the cam lock portion 405 engaged in FIG. 4A. The latch 406 may be closed in the locked position, e.g., as noted by the latch 406 contacting the receptacle 410 at a first location 404.

The interlock 412 is preferably active to prevent the locking mechanism 402 from releasing the drive from the receptacle when the locking mechanism is in the locked position. For example, the interlock 412 may prevent movement of the latch 406 until medium motion ceases. In another approach, the interlock 412 may allow some movement of the latch 406, but keeps the cam lock portion 405 engaged in spite of the latch motion.

It should be noted that while in the locked position, the interlock may not prevent the locking mechanism 402 from releasing the drive 403 from the receptacle 410, e.g., the interlock activates in response to the user attempting to remove the drive when the medium is in motion.

Referring now to FIG. 4B, the locking mechanism 402 is in a position between the locked and unlocked positions (see the unlocked position in FIG. 4C). The locking mechanism 402 may be selectively constrained by the interlock 412 in the second position located between the locked and unlocked positions.

According to various embodiments, while in the second position, the locking mechanism 402 may remain engaged, thereby locking the drive 403 into the receptacle 410.

According to other embodiments, while in the second position, the locking mechanism 402 may be partially engaged, where the partially engaged locking mechanism allows the latch 406 to be partially retracted away from the receptacle 410, yet still locks the drive 403 in the receptacle 410, as shown in FIG. 4B. The inability to pull the latch 406 past the second position (in a direction towards the unlocked position) may signify to the user that the medium of the drive 403 may be in motion.

A determination may be made whether or not removal of the drive 403 from the receptacle 410 is acceptable in response to a user pulling the latch 406 of the drive 403 into the second position. Processes and/or operations for determining if removal of the drive 403 from the receptacle 410 is acceptable, so as to avoid causing damage to the drive 403 and/or the medium of the drive 403 will be described elsewhere below, e.g., see method 500.

When removal of the drive is determined to be acceptable, the interlock allows the locking mechanism to release the drive 403 from the receptacle 410. Referring to FIG. 4C, system 400 is illustrated with the locking mechanism 402 in the unlocked position, whereby the drive 403 may be removed from the receptacle 410.

System 400 may also include an override release mechanism 416 that enables physical removal of the drive 403 from the receptacle 410. The override release mechanism 416 may manipulate the interlock and/or the locking mechanism 402 to allow physical removal of the drive from the receptacle, and may be mechanical and/or electronic.

According to various embodiments, the override release mechanism 416 may mechanically cause the interlock 412 not to prevent the locking mechanism 402 from allowing physical removal of the drive 403 from the receptacle 410. In other embodiments, the override release mechanism 416 may be configured to mechanically disengage the locking mechanism 402, thereby releasing the drive 403 from the receptacle 410.

A user may use the override release mechanism 416 in response to the user's desire to remove the drive 403 outweighing any concern of harm that may occur to the drive 403 and/or the drive medium, e.g., in response to the medium being in motion. A user may additionally and/or alternatively use the override release mechanism 416 in response to a functional failure occurring in system 400, e.g., a jammed, malfunctioning or nonfunctioning interlock 412 or locking mechanism 402, an error in the processing circuit 414, etc.

With continued reference to a mechanically implemented override release mechanism 416, according to one embodiment, the override release mechanism 416 may include a press button, where the interlock 412 may cause or allow the locking mechanism 402 to release the drive 403 from the receptacle 410 in response to the button being pressed.

In one approach, the override release mechanism 416 button may be recessed from the surface to which mounted, e.g., to prevent the button from being accidently pressed and/or bumped by a user. In other approaches, the override release mechanism 416 button may be flush or protruding from the surface to which mounted.

According to another embodiment, the override release mechanism 416 may include a pull ring.

Referring now to an electrically implemented override release mechanism 416, according to various embodiments, the processing circuit 414 may be configured to receive an input from the override release mechanism 416. The processing circuit 414 may control at least one function of the interlock 412 in response to receiving an input from the override release mechanism 416. For example, the override release mechanism 416 may include an electrical button, a touch pad with a sensor, etc.

A method for determining if removal of the drive 403 from the receptacle 410 is acceptable, so as to avoid causing damage to the drive and/or the medium of the drive 403, will now be described below, e.g., see method 500.

Figure 5:
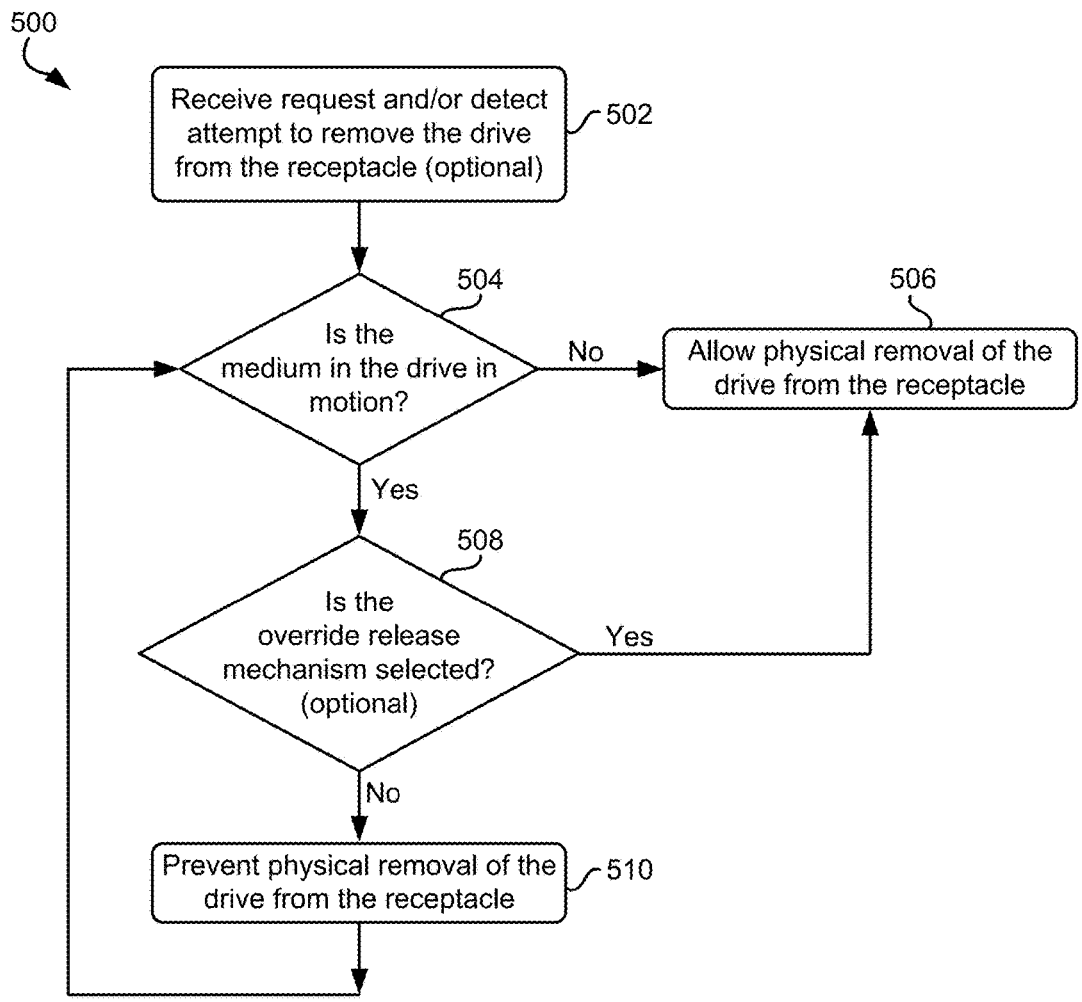
FIG. 5 illustrates a flowchart of a method, in accordance with one embodiment.

Now referring to FIG. 5, a flowchart of a method 500 is shown according to one embodiment. The method 500 may be performed in accordance with the present invention in conjunction with any of the environments and/or embodiments depicted in FIGS. 1-4C, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a computer, drive, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

Although method 500 is described to be capable of being performed on a computer, it should be noted that method 500 may be performed by the drive controller, a library controller, a storage controller, a host, etc., any of which may be considered to be a computer.

Referring now to FIG. 5, optional operation 502 of method 500 includes receiving a request to remove a drive from a receptacle and/or detecting an attempt to remove the drive from the receptacle. According to one example, detection of a user attempting to pull a drive from a receptacle initiates the method 500. In such an example, the user attempting to pull the drive from the receptacle may transition a latch of the drive system from a first locked position to a second position that is between the locked and unlocked positions.

According to another approach, the received request may originate from a drive removal scheduling queue. According to yet another approach, the received request may originate from a source that would be would be understood by one of skill in the art upon reading the present descriptions.

Decision 504 of method 500 includes determining whether a medium in a drive is in motion, the drive being mounted in a receptacle. As described elsewhere herein, determining whether a medium in a drive is in motion prior to physically removing the drive from the receptacle may prevent damage from occurring to the dive and/or to the medium of the drive. For example, such damage may be avoided by waiting to physically remove the drive from the receptacle until the medium is no longer in motion and/or the head(s) of the drive have been parked in a secured resting position.

According to one embodiment, magnetic field sensing may be used to determine whether the medium in the drive is in motion. In one approach, a magnetic field sensor such as a 'Hall' effect sensor may be used in association with the spindle and/or motor windings to determine whether the medium in the drive is in motion. An implementation of a magnetic field sensor in a drive and/or receptacle may be particularly useful in condensed/small systems which include a drive and receptacle, e.g., due to magnetic field sensors being capable of being relatively very small in size.

According to another embodiment, back electromotive force (back EMF) sensing may be used to determine whether the medium in the drive is in motion. In one approach, the drive and/or the receptacle may include one or more EMF sensors for determining whether the motor in the drive is in motion by detecting currents that are created by the coils in the turning motor, even if the motor of the drive is unpowered.

According to yet another embodiment, optical detection may be used to determine whether the medium in the drive is in motion. In one approach, the drive (and/or the receptacle if the medium is externally visible) may include one or more optical sensors for determining whether the medium in the drive is in motion.

According to one approach, a photo cell/strobe may be activated in response to a latch of a drive system being pulled and/or an attempt being made to pull the latch past the locked position. Such a pull and/or attempted pull may activate a light beam that pulses on the medium (surface and/or edge of the medium) for sensing medium movement via the photo cell. Movement of the medium may be calculated using the length of the reflected bounce of the light beam. As the medium movement decreases, the length of the light beam sensed may gradually increases until the medium motion ceases, and thereby the reflected light beam dimension no longer increases. A medium may be determined to be not in motion in response to the reflected light beam dimension no longer increasing.

It may be noted that the light beam described above may originate from any type of light source, e.g., an ultraviolet UV light, a light emitting diode (LED), a laser, etc.

According to another embodiment, direct sensing of at least one characteristic may be used to determine whether the medium in the drive is in motion. It may be noted that direct sensing of at least one characteristic may include sensing for the presence of the at least one characteristic and/or sensing for the lack of presence of the at least one characteristic.

The at least one characteristic may be selected from the group consisting of motor rotation, drive logic, and head position. The at least one characteristic may also and/or alternatively include drive component lock status, e.g., whether the interlock is engaged, whether a portion of the locking mechanism (such as a cam lock portion) is engaged, whether a portion of the locking mechanism is not engaged etc. These characteristics and/or statuses may be known to the drive controller and may be used when the drive controller performs method 500.

According to yet another embodiment, air movement sensing in the drive may be used to determine whether the medium in the drive is in motion. In such an embodiment, the drive and/or the receptacle may include one or more air movement sensors for determining whether the medium in the drive is in motion.

In such an embodiment, air movement sensing may include any type of air sensing. According to one approach, air movement sensing may include determining the laminar flow of air in the drive. According to another approach, air movement sensing may include calculating a Bernoulli effect of air over the medium of the drive. According to yet another approach, air movement sensing may include detecting air movement through the filter in a medium case of the drive.

According to yet another approach a centrifugal meter may be used to determine whether the medium in the drive is in motion. The centrifugal meter may be a part of, or coupled to, the interlock and/or the processing circuit. In such an approach, the centrifugal meter may measure the power output that results from a medium in the drive being in motion. Measurements taken by the centrifugal meter may be used by a circuit, e.g., see processing circuit 414 of system 400, to determine if removal of the drive from the receptacle is acceptable. According to one example, the measurements may be compared to predetermined threshold values stored on the circuit to determine if removal of the drive from the receptacle is acceptable.

With continued reference to decision 504 of method 500, in response to determining that the medium is not in motion, operation 506 may be performed, which includes allowing physical removal of the drive from the receptacle, e.g., see the "NO" logic path extending from decision 504 to operation 506. As described elsewhere herein, removing the drive from the receptacle when the drive is not in motion as opposed to removing the drive from the receptacle when the drive is in motion may preferably prevent damage from occurring to the drive and/or the medium of the drive as a result of, e.g., rough handling of the active drive while the drive is particularly vulnerable to damage (while the medium is in motion), a head contacting and/or scraping across the medium, etc.

In response to determining that the medium is in motion (at noted by the "YES" logic path extending from decision 504), it may optionally be determined whether pulling the drive from the receptacle regardless of the medium in the drive being in motion is desirable and/or has been requested, e.g., see decision 508.

Decision 508 of method 500 includes determining whether an override release mechanism has been selected. In response to determining that the override release mechanism has been selected (at noted by the "YES" logic path extending from decision 508), physical removal of the drive from the receptacle is allowed.

In response to determining that the override release mechanism has not been selected (at noted by the "NO" logic path extending from decision 508), and additionally and/or alternatively, in response to determining that the medium is in motion, physical removal of the drive from the receptacle may be prevented, e.g., see operation 510.

Operation 510 includes preventing physical removal of the drive from the receptacle, e.g., until the medium in the drive is no longer in motion. As described elsewhere herein (see system 400), preventing physical removal of the drive from the receptacle may include controlling an interlock that prevents a locking mechanism from releasing the drive from the receptacle.

According to one embodiment a drive shutdown request may be stored and/or triggered in response to physical removal of the drive from the receptacle being prevented. In one approach, an update may be later output to a user in response to the medium in the drive no longer being in motion and/or the locking mechanism no longer being engaged.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   determining whether a medium in a drive is in motion, the drive being mounted in a receptacle; and
   in response to determining that the medium is in motion, preventing physical removal of the drive from the receptacle.

2. The computer-implemented method of claim 1, wherein preventing physical removal of the drive from the receptacle includes controlling an interlock that prevents a locking mechanism from releasing the drive from the receptacle.

3. The computer-implemented method of claim 1, wherein magnetic field sensing is used to determine whether the medium in the drive is in motion.

4. The computer-implemented method of claim 1, wherein back electromotive force sensing is used to determine whether the medium in the drive is in motion.

5. The computer-implemented method of claim 1, wherein optical detection is used to determine whether the medium in the drive is in motion.

6. The computer-implemented method of claim 1, wherein direct sensing of at least one characteristic is used to determine whether the medium in the drive is in motion, the at least one characteristic being selected from the group consisting of motor rotation, drive logic, and head position.

7. The computer-implemented method of claim 1, wherein air movement sensing in the drive is used to determine whether the medium in the drive is in motion.

8. The computer-implemented method of claim 1, wherein the drive is a hard disk drive, wherein the medium is a hard disk.

9. A computer program product for controlling removal of a drive, the computer program product comprising a computer readable storage medium having program instructions embodied therewith, wherein the computer readable storage medium is not a transitory signal per se, the program instructions readable and/or executable by a computer to cause the computer to perform a method comprising:
   determining, by the computer, whether a medium in a drive is in motion, the drive being mounted in a receptacle; and
   in response to determining that the medium is in motion, preventing, by the computer, physical removal of the drive from the receptacle.

10. The computer program product of claim 9, wherein preventing physical removal of the drive from the receptacle includes controlling an interlock that prevents a locking mechanism from releasing the drive from the receptacle.

11. The computer program product of claim 9, wherein magnetic field sensing is used to determine whether the medium in the drive is in motion.

12. The computer program product of claim 9, wherein back electromotive force sensing is used to determine whether the medium in the drive is in motion.

13. The computer program product of claim 9, wherein optical detection is used to determine whether the medium in the drive is in motion.

14. The computer program product of claim 9, wherein direct sensing of at least one characteristic is used to determine whether the medium in the drive is in motion, the at least one characteristic being selected from the group consisting of motor rotation, drive logic, and head position.

15. The computer program product of claim 9, wherein air movement sensing in the drive is used to determine whether the medium in the drive is in motion.

16. A system, comprising:
   a mechanism configured to selectively prevent physical removal of a drive from a receptacle; and
   a processing circuit configured to control the mechanism, wherein the processing circuit causes the mechanism to prevent allowing physical removal of the drive from the receptacle in response to determining that a medium in the drive is in motion.

17. The system of claim 16, wherein the mechanism includes a locking mechanism that is coupled to the receptacle.

18. The system of claim 16, wherein the mechanism includes a locking mechanism that is coupled to the drive.

19. The system of claim 16, wherein the mechanism includes a locking mechanism and an interlock, wherein the locking mechanism is positionable between three positions, wherein the locking mechanism prevents removal of the drive from the receptacle in a locked position, wherein the locking mechanism allows removal of the drive from the receptacle in an unlocked position, wherein the locking mechanism is selectively constrained by the interlock in a second position located between the locked and unlocked positions.

20. The system of claim 16, comprising an override release mechanism for causing the mechanism to allow physical removal of the drive from the receptacle.

* * * * *